United States Patent [19]

Karl et al.

[11] Patent Number: 4,751,095
[45] Date of Patent: Jun. 14, 1988

[54] ASPARTAME STABILIZATION WITH CYCLODEXTRIN

[76] Inventors: Curtis L. Karl, 7830 47 1/2 Cir. No., New Hope, Minn. 55428; Wolfram G. Schynoll, 1034 27 Ave. SE., Minneapolis, Minn. 55414

[21] Appl. No.: 721,342

[22] Filed: Apr. 9, 1985

Related U.S. Application Data

[63] Continuation-in-part of Ser. No. 517,888.

[51] Int. Cl.$^4$ .................. A23L 1/236; A23L 3/34
[52] U.S. Cl. .................. 426/548; 426/654; 426/661; 426/321
[58] Field of Search .................. 435/97, 188; 426/548, 426/654, 330.3, 321, 661, 590

[56] References Cited

U.S. PATENT DOCUMENTS 4,332,825  6/1982  Miyawaki et al. .................. 426/599

FOREIGN PATENT DOCUMENTS 56-42560  4/1981  Japan .................. 426/654

*Primary Examiner*—Elizabeth Weimar
*Attorney, Agent, or Firm*—Ernest G. Szoke; Henry E. Millson, Jr.; Patrick J. Span

[57] ABSTRACT

The present invention deals with the stabilization of aspartame, by the formation of an inclusion complex of aspartame and cyclodextrin. The inclusion complex is formed by combining the aspartame with the cyclodextrin in a medium suitable for formation of the inclusion complex before a substantial degree of hydrolysis of the aspartame can occur. Upon drying a dry inclusion complex is formed.

12 Claims, No Drawings

ASPARTAME STABILIZATION WITH CYCLODEXTRIN

This is a continuation-in-part of application Ser. No. 517,888 having a filing date of July 28, 1983 now abandoned.

BACKGROUND OF THE INVENTION

1. Field of the Invention

This invention deals with artificial sweeteners.

2. Description of the Art Practices

In recent years suitable substitutes for saccaharin and cyclamates have been sought due to potential health consequences of overuse of these sweetners.

Aspartame has been suggested as a replacement for all artificial sweeteners due to its sweetening properties and purported low toxicity levels. The use of aspartame is described in a bulletin of G.D. Searle & Co. through its subsidiary Searle Food Resources, Inc., Box 1045, Skokie, Ill. 60076 in an article entitled THE NUTRASWEET BREAKTHROUGH, Copyright 1982, Publication No. US 001-682 which is incorporated by reference. A portion of the publication indicates that aspartame loses its effectiveness due to breakdown of the components under conditions where hydrolysis may occur, particularly in the acid pH region. Further discussions of aspartame under the title ASPARTAME CLEARED FOR SOFT DRINKS was recently published at page 41 of the Food Chemical News, Vol. 25, No. 17 (July 4, 1983) which is a publication of Food Chemical News, Inc., 1101 Pennsylvania Avenue, S.E., Washington, D.C. 20003. The Food Chemical News article is also herein incorporated by reference.

The chemistry of cyclodextrin compounds is discussed in an article entitled CYCLODEXTRIN INCLUSION COMPOUNDS IN RESEARCH AND INDUSTRY by Wolfram Saenger at pages 344–362 of the publication ANGEW. CHEM. INT. ED. ENGL., Vol. 19 (1980). A further discussion of cyclodextrins is found in an article entitled FORMATION AND MOLECULAR DYNAMICS OF CYCLOAMYLOSE INCLUSION COMPLEXES WITH PHENYLANINE by Inoue and Miyata in the Bull. Chem. Soc. Jpn. Vol. 54, pages 809–816 (1981). Both of the aforementioned articles on cyclodextrins are herein incorporated by reference.

Japanese patent publication No. 56-2560 teaches and describes the use of beta-cyclodextrin in combination with a variety of sweetners including aspartame in order to produce a water-soluble solid sweetener. This publication indicates that by using beta-cyclodextrin in combination with sweeteners such as aspartame, that a water-soluble solid sweetener can be prepared which has desirable properties such as resistance to wear and tear. This reference also indicates that the solid sweeteners prepared by combining beta-cyclodextrin with other sweeteners are easily dissolved in water, easily tabletized or shaped, having excellent smoothness and crumbling properties. Thus, beta-cyclodextrin is used in this reference as a bulking agent for the preparation of a solid tabletized sweetener. Maruzen teaches that such solid sweeteners can be prepared by mixing and molding. The sweetener can then be transported or added into water for sweetening purposes.

It has now been discovered that cyclodextrin can be combined with aspartame under conditions which result in the stabilization of aspartame against hydrolysis.

It is thus an object of the instant invention to describe a composition of matter containing aspartame in a specific structural relationship with cyclodextrin (an inclusion complex) which serves to reduce hydrolysis and gives more stability to the aspartame. A further object of the instant invention is to provide a method whereby the protection of aspartame against hydrolysis can be optimized. A further object of the instant invention is to describe a method for producing the inclusion complex of cyclodextrin and aspartame in a solid form which preserves the aspartame under adverse storage conditions such as heat, humidity, light, and acidity. Other objects will become apparent as this description proceeds.

SUMMARY OF THE INVENTION

The invention describes a method of stabilizing aspartame from hydrolysis including the steps of combining aspartame and a member selected from the group consisting of:

(a) alpha-cyclodextrin;
(b) beta-cyclodextrin;
(c) gamma-cyclodextrin; and,
(d) mixtures of the above, wherein the combining is conducted prior to a substantial degree of hydrolysis of the aspartame. The aspartame and the cyclodextrin are combined in a medium suitable for the formation of the inclusion complex. The inclusion complex then forms.

Also, described is a composition including aspartame and a member selected from the group consisting of:

(a) alpha-cyclodextrin;
(b) beta-cyclodextrin;
(c) gamma-cyclodextrin; and,
(d) mixtures of the above.

The aspartame and the cyclodextrin are present in a dry inclusion complex. The process for preparing this dry inclusion complex is also described.

Further described is a cooked food product including aspartame and a member selected from the group consisting of:

(a) alpha-cyclodextrin;
(b) beta-cyclodextrin;
(c) gamma-cyclodextrin; and,
(d) mixtures of the above.

Also, described is a food product including aspartame and a member selected from the group consisting of:

(a) alpha-cyclodextrin;
(b) beta-cyclodextrin;
(c) gamma-cyclodextrin; and,
(d) mixtures of the above.

Throughout the specification and claims, percentages and ratios are by weight and temperatures are in degrees Celsius unless otherwise indicated.

DETAILED DESCRIPTION OF THE INVENTION

The present invention as previously indicated deals with the manner of stabilizing aspartame so that it does not degrade into its components or unwanted by-products. This invention enables aspartame to retain a longer shelf life. Stabilization is provided, which reduces the formation of the unsweet by-products of hydrolysis, by forming an inclusion complex whereby aspartame is at least partially included inside the circular structure of cyclodextrin. The included aspartame receives protection from hydrolysis type reactions which result in the degradation of the aspartame into non-sweet compounds. Once this inclusion complex is formed, the degradation or hydrolysis of aspartame is considerably reduced, even in the most hydrolyzing conditions.

A primary reason for desiring to avoid the breakdown into by-products is that some of the by-products do not have the sweetness characteristics of aspartame and thus the amount of aspartame which must be used is greater than that which would be used in the absence of degradation. Therefore, a substantial cost savings in the use of aspartame can be achieved if the aspartame is stabilized. Secondly, to avoid any potential safety considerations, the level of degradation products should be minimized.

The structure of aspartame is shown below.

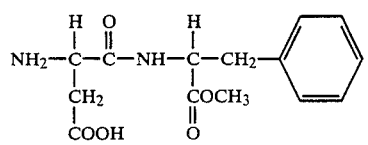

Formula I $C_{14}H_{18}N_2O_5$ Molecular Weight 294.31

Aspartame is known under the chemical name N-L-alpha-aspartyl-L-phenylalanine 1-methyl ester which corresponds to the structure given above. While the structure given above is believed to be the only practical structure for aspartame which may be utilized for sweeteners, it is of course recognized that the aspartame may be obtained in the form of derivatives such as salts, i.e. sodium, potassium, calcium, magnesium and the like, and that if desired the methyl ester may be replaced with other compatible ester groups such as ethyl, propyl or the like. Similarly on the phenyl ring substituents such as methyl are also possible. For practical purposes, however, the named compound in the structure give above is the most important.

The cyclodextrins with which the present invention is concerned includes that shown below as beta-cyclodextrin (Formula II).

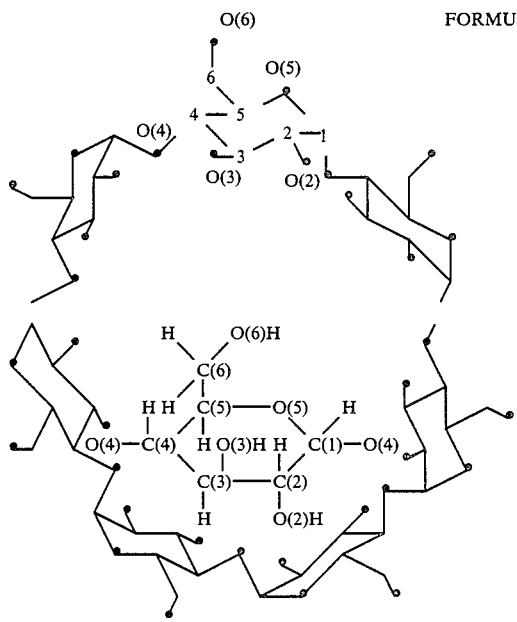

FORMULA II

-continued

Chemical structure and numbering of the atoms shown for β-cyclodextrin:
- oxygen atoms,
- hydroxy groups.

The structure above corresponds to the preferred element of the present invention which is a beta-cyclodextrin which contains seven glucoside units. The structure of alpha-cyclodextrin is shown below as Formula III.

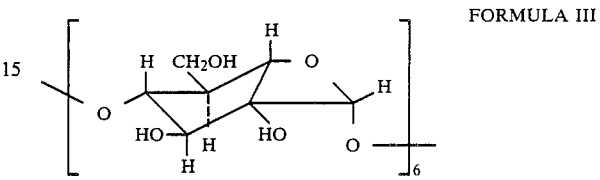

FORMULA III

The structure of gamma-cyclodextrin is identical to beta-cyclodextrin except that one additional glucopyranose unit is present in the ring giving a total of 8 glucopyranose units. The individual glucopyranose unit is shown in the center of Formula II. Gamma-cyclodextrin is shown at Formula IV.

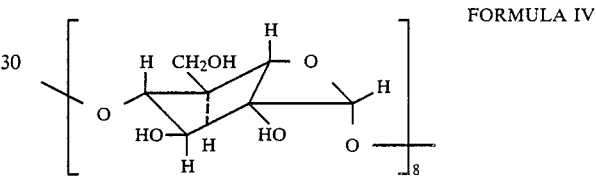

FORMULA IV

The cyclodextrins mentioned above are commercially available and may be utilized in the present invention without modification.

In the present invention, as both the cyclodextrin and the aspartame are dry ingredients, they may be simply combined in the desired proportions and utilized. Because a mere dry blend of cyclodextrin and aspartame will lack a medium suitable for the formation of the inclusion complex, the aspartame will not form the inclusion complex and be stabilized until the blend is added to a liquid medium such as water. Since both hydrolysis and stabilization reactions of aspartame begin immediately upon dissolution in the liquid medium, some portion of aspartame will be hydrolyzed before maximum stabilization by the cyclodextrin can occur. This loss of aspartame and subsequent sweetness it imparted to the liquid medium is tolerable under some conditions, such as when the product containing the cyclodextrin-stabilized aspartame is consumed shortly after its preparation, or if the liquid medium is one in which the rate of hydrolysis of aspartame is slow. For optimum stabilization and reduction of the hydrolysis reactions of aspartame, a solid composition containing the inclusion complex of cyclodextrin and aspartame can be formed. This will considerably reduce hydrolysis if the aspartame is then subjected to conditions ordinarily causing it. Thus, if such a solid compositions is, during storage, subjected to light, hydrolyzing compounds, heat, conditions which would ordinarily cause hydrolysis such as substances having a pH in excess of 6 and/or acid, the aspartame will be stabilized and its degradation will be considerably reduced. Such stabilization can be maximized by using large amounts of cyclodextrin relative to the aspartame.

While the aspartame is not particularly unstable, i.e. leading to degradation or hydrolysis products, when it is in the dry state, it is desirable to obtain a convenient mixture of the aspartame and cyclodextrin so that such may be shipped to any convenient point for manufacture. Although this is not a preferred embodiment of the instant invention, a mere admixture of aspartame and cyclodextrin will, to an extent, stabilize the aspartame and decrease hydrolysis in that when such an admixture is subjected to the hydrolyzing conditions a liquid such as water, the protective complex will form. For instance, a dry mixture of the cyclodextrin and aspartame may be shipped to a bottling plant in a remote corner of the world and thereafter used as a stabilized sweetening system for a soft drink. It is of course also possible to prepare the blend of cyclodextrin and aspartame in a liquid such as water or other medium. The presence of heat, acidic conditions and the water can lead to degradation of the aspartame.

The cyclodextrin has been found to stabilize the aspartame and to extend the useful life of aspartame containing products. However, the aspartame will at some point degrade under the above described condition. Therefore, the most practical manner of handling the product is as a powdered concentrate so that the aspartame is as active as possible when first introduced to degrading conditions. In this manner, the aspartame is in a highly divided state which will allow it to dissolve more easily and also increase the contact with cyclodextrin so that the inclusion complex can form. A more effective and preferred method of extending the useful life of aspartame, however, and one which is even more practical for safeguarding aspartame against degrading conditions during storage, is to prepare the dry inclusion complex.

The inclusion complex can be formed by combining aspartame and cyclodextrin in a medium suitable for the formation of the inclusion complex. A suitable medium is a liquid that will solubilize both aspartame and cyclodextrin. When dissolved in such a liquid, a portion of the dissolved aspartame concentration will become inserted into the cyclodextrin ring, thus forming the inclusion complex. After this occurs within the liquid medium, the mixture can be dried to leave the inclusion complex. Any drying technique which will succeed in removing the liquid medium from the aspartame cyclodextrin mixture is acceptable. Preferred drying methods will apply such drying techniques as: spray-drying, freeze-drying, heat, and/or low pressure.

The aspartame is degraded or hydrolyzed to aspartylphenylalanine, phenylalanine, methanol, aspartic acid, and diketopiperazine. Thus, any substantial amounts of these materials or their derivatives in addition to those present from the manufacturer of aspartame are to be minimized in accordance with the invention.

The aspartame and the cyclodextrin may be combined in any convenient proportions. That is, the aspartame will be stabilized even by very small amounts of the cyclodextrin. Thus, even very small amounts of cyclodextrin relative to the aspartame will allow the formation of some amount of the inclusion complex and will afford some protection and stabilization from hydrolysis. Large concentrations of the cyclodextrin, however, will favor the formation of the inclusion complex and will give greater and more optimized stabilization from aspartame hydrolysis. In accordance with the instant invention, it is therefore preferred to use cyclodextrin in a larger concentration than the aspartame.

The presence of water or a suitable medium is necessary for the inclusion complex to be formed between the aspartame and the cyclodextrin. A suitable medium allows the formation of the inclusion complex between the aspartame and the cyclodextrin. Any liquid which can dissolve both cyclodextrin and the aspartame is a suitable medium. Such liquids can, in the drying step, be removed to a substantially complete degree if desired. A substantially complete drying will be most preferred under particular circumstances, for example, when a long storage period is contemplated when reuse as a sweetener for food is contemplated or when media other than water or aqueous ethanol are used. Suitable media include water, an aqueous mixture of alcohols, or aqueous mixtures of alcohols such as aqueous methanol, aqueous ethanol and aqueous isopropanol. Acceptably such liquid media can be removed in the drying step to a moisture content level of less than 8% by wt.

It is preferred that the cyclodextrin be present in amounts greater than the aspartame as this favors formation of the inclusion complex. It is feasible to formulate the product such that the weight ratio of the aspartame to the cyclodextrin is from about 5:1 to about 1:200; conveniently from about 2:1 to about 1:150; preferably from about 3:2 to about 1:100 and most preferably from about 1:1 to about 1:9. A highly desirable ratio of the aspartame to cyclodextrin is about 1:3 by weight. Weight ratios which tend to optimize the formation of the inclusion complex by having an excess of the cyclodextrin and which are thus preferred are from about 1.1:1 to about 200:1 of cyclodextrin to aspartame, from about 1.1 to about 150:1 and from about 1.1:1 to about 100.

As long as the liquid medium used is capable of dissolving both aspartame and cyclodextrin, the inclusion complex will form. It is possible to add varying excess amounts of cyclodextrin and/or aspartame so that either the aspartame or the cyclodextrin or both are present in the liquid medium, both as a solid or in its dissolved state. Thus it is possible to prepare a solution containing the inclusion complex wherein either all of the aspartame is dissolved, and the cyclodextrin is both dissolved and solid, or a solution wherein the aspartame is both dissolved and solid and the cyclodextrin is dissolved, although the latter would not maximize aspartame stability. The type of slurry where the cyclodextrin is both dissolved and solid, is highly advantageous to the formation of the inclusion complex. It is also possible to form a slurry wherein both the aspartame and the cyclodextrin are present in such large amounts that both are present in solid form. In any of these cases, the solution or the slurries can be dried to give a composition containing the inclusion complex. In this included form, the aspartame is stabilized against hydrolysis, and if such a composition is subjected to conditions which ordinarily cause hydrolysis of aspartame, the degradation of the aspartame is reduced.

The reduction of aspartame hydrolysis is illustrated in Example 4 which shows the extended half-life of aspartame in an aqueous solution. The importance of stabilizing aspartame against hydrolysis is even more appreciated by realizing that aspartame is most unstable at the very pH ranges which occur in food products, namely below 3 and over 5.5.

Since the stabilization of aspartame is important when using aspartame as a food sweetener, it is important to optimize this stabilization. Most preferably, therefore, the aspartame is stabilized by the formation of the inclusion complex before its addition to food products. Although in certain instances a food product can act as a medium which would allow the formation of the inclusion complex, such a medium also contains other materials which might inhibit the formation of the inclusion complex, and which would tend to disperse the aspartame instead of allowing the proximity of the aspartame to the cyclodextrin in order to form the complex. Such food substances would also, due to the presence of hydrolyzing materials and adverse pH conditions, tend to encourage or cause hydrolysis of the aspartame at the same time. In accordance with the instant invention, it is therefore preferred to form the inclusion complex before addition to such food substances. This can be achieved either by combining the aspartame and the cyclodextrin in a suitable medium such as water which can then be added to the food substance in the proper amount, or the dry inclusion complex can be formed which will then allow its measured addition to the food substance. In either case, stabilization is optimized by the preformation of the inclusion complex; stabilization is even more optimized under such conditions when cyclodextrin is in excess.

Where desired the addition of the aspartame to the cyclodextrin may take place in water. Water is used in the broadest sense of the term in that the mixing could be done in a bottling plant and thus ingredients other than the water, aspartame, and cyclodextrin may be present.

The amount of water in the product is simply that amount used normally. Therefore, as a general guideline the water content to the aspartame will be from about 10,000:1 to about 1:13.

The method and composition of the present invention may be used in any of the conventional areas where aspartame would be used alone. The products of the present invention are particularly useful in those areas where the aspartame would be subjected to elevated temperatures and/or acidic conditions. All manner of food products, beverages and table sweeteners are suggested utilities of the present invention. The present invention may also include natural sugars such as sucrose, glucose or fructose with the aspartame where the total absence of natural sugars is not required. The cyclodextrin is itself naturally sweet and therefore, may enhance the quality of the product.

The effectiveness of the present invention is demonstrated by measuring at various times for the presence of aspartame. The use of cyclodextrins and in particular the preferred beta-cyclodextrin demonstrates that the aspartame is not substantially hydrolyzed and therefore should be without substantial loss of sweetening ability. The hydrolysis products of aspartame are minimized when compared to similar products in which the cyclodextrin is omitted. The cyclodextrins have not been found to substantially affect the taste of a product containing aspartame.

The following are suggested exemplifications of the present invention.

EXAMPLE I

Part A

A mixture of aspartame in the form N-L-alpha-aspartyl-L-phenylalanine 1-methyl ester and beta-cyclodextrin is obtained by adding 1 part of the aspartame and 3 parts of beta-cyclodextrin together. These materials are then thoroughly combined in a Waring blender to give a finely divided powder.

The product obtained from this Example is useful as a dried powder which may be shipped to remote bottling plants for combination of the remaining ingredients necessary to prepare a soft drink. This Example is repeated using first, alpha-cyclodextrin, and then gamma-cyclodextrin with similar results. Mixtures of alpha and gamma, alpha and beta, beta and gamma, and then all three cyclodextrins in equal parts also give similar results.

Example I may be modified by adding 5 parts of the mixture of aspartame and beta-cyclodextrin described above with 1 part of sucrose to obtain a table sweetener.

The presence of beta-cyclodextrin in this dry blend will stabilize the aspartame from hydrolysis when this contacts water, or an ordinarily hydrolyzing medium by forming the inclusion complex.

Part B

For superior stabilization, however, and to increase storage life, the dry blend of Part A is slurried in water to allow beta-cyclodextrin and aspartame to form the inclusion complex. This slurry is then dried by using a vacuum removal of water, and/or the application of heat, thereby leaving the inclusion complex in its dried form.

EXAMPLE II

Aspartame in the form described in Example I, Part A, and beta cylcodextrin are combined in a weight ratio of 1 part to 3 parts.

The mixture above is dissolved in 800 parts water. One portion of the aqueous mixture is used to prepare a soft drink by adding a flavoring syrup.

The second portion is obtained as the dry inclusion complex by spray-drying the sample to a moisture content of 8%. The inclusion complex may also be obtained by freeze-drying the aqueous mixture to 8%.

The products will be observed to retain stability when exposed to conditions favoring hydrolysis of the aspartame.

EXAMPLE III

Part A

A cake mix is prepared using the aspartame and beta-cyclodextrin mixture of Example I as the replacement for sucrose. A cake is baked according to the above at a temperature of 175° C. without loss of sweet taste. Some stabilization occurs when a dry blend as described in Example I, Part A, is added to the cake mix. This stabilization is not maximum, however, since other cake ingredients hinder the formation of the inclusion complex before aspartame hydrolysis.

Part B

A cake mix is prepared using aspartame and beta-cyclodextrin product from a process as described in Example I, Part B, as the replacement for sucrose. Aspartame stabilization in this cake mix is superior over the cake mix prepared in Part A of this Example since preformation of the inclusion complex optimizes the protection of the aspartame from hydrolysis.

Part C

Similarly, a pudding is formulated as above, and cooked at 100° C. with the sweetener value maintained. Some stabilization occurs when the aspartame and the cyclodextrin dry blend is described in Example I, Part A, is added to the pudding. This stabilization is not maximum, however, since other pudding ingredients hinder the formation of the protective inclusion complex.

Part D

A pudding is prepared using an aspartame and beta-cyclodextrin product from a process as described in Example I, Part B as the replacement for sucrose. Aspartame stabilization in this pudding is superior over the pudding prepared from the dry blended aspartame and beta-cyclodextrin of Example I, Part A, since preformation of the inclusion complex optimizes the protection of the aspartame from hydrolysis.

Part E

A gelatin is formulated by using the above sweetner and heating the product to 80° C. without losing sweetner value. Some stabilization occurs when the sweetner is prepared as described in Example I, Part A. This stabilization, however, is not a maximum since some hydrolysis occurs before hinder the formation of the protective inclusion complex.

Part F

A gelatin is prepared using an aspartame and beta-cyclodextrin product as described in Part B, Example I, as the replacement for sucrose. Aspartame stabilization in this gelatin is superior over the gelatin prepared from the dry-blended aspartame and beta-cyclodextrin of Part A, Example I, since preformation of the inclusion complex optimizes protection of the aspartame from hydrolysis.

EXAMPLE IV

Five sets of aqueous solutions having 2 solutions per set were prepared at the pH values listed below. Each set had one solution containing 5 millimoles (mM) of aspartame (Asp) and another solution with both 5 mM of Aspartame, and 10 mM of beta-cyclodextrin ($\beta$-CD). The hydrolysis of the aspartame in each solution was measured using high performance liquid chromatography (HPLC). The temperature of all of the solutions was maintained at 55° C. The results are given in terms of aspartame half life; and the percent stability improvement realized by the presence of the beta-cyclodextrin is given in terms of percent stability improvement for each set of solutions in the table below.

TABLE

| Set | Solutions | pH | Temp. (°C.) | $t \frac{1}{2}$ (Hrs) | % Stability Improvement |
|-----|-----------|----|----|------|----|
| 1 | Asp | 2 | 55 | 71 | |
| | Asp & $\beta$-CD | 2 | 55 | 93 | 31 |
| 2 | Asp | 3 | 55 | 158 | |
| | Asp & $\beta$-CD | 3 | 55 | 214 | 35 |
| 3 | Asp | 3 | 55 | 156 | |
| | Asp & $\beta$-CD | 3 | 55 | 195 | 25 |
| 4 | Asp | 5 | 55 | 508 | |
| | Asp & $\beta$-CD | 5 | 55 | 590 | 16 |
| 5 | Asp | 6 | 55 | 3.0 | |
| | Asp & $\beta$-CD | 6 | 55 | 4.0 | 33 |

What is claimed is:

1. A method of stabilizing aspartame from hydrolysis comprising combining aspartame and a larger amount of a member selected from the group consisting of:
   (a) alpha-cyclodextrin;
   (b) beta-cyclodextrin; and
   (c) gamma-cyclodextrin;
   in a medium suitable for the formation of an inclusion complex between the cyclodextrin and the aspartame, wherein the aspartame and the cyclodextrin form an inclusion complex before a substantial degree of hydrolysis of the aspartame occurs.

2. A method as described in claim 1 wherein the ratio by weight of cyclodextrin to aspartame is at least 1.1:1.

3. A method for the formation of a dry inclusion complex so that aspartame is stabilized from hydrolysis comprising:
   (1) combining aspartame and a larger amount of a member selected from the group consisting of:
      (a) alpha-cyclodextrin
      (b) beta-cyclodextrin and
      (c) gamma-cyclodextrin
      in a suitable medium to form a mixture containing an inclusion complex of said aspartame and said cyclodextrin, before a substantial degree of hydrolysis of said aspartame can occur and
   (2) drying said mixture whereby said dry inclusion complex is formed.

4. A method as described in claim 3 wherein said drying is either spray drying or freeze drying.

5. A method as described in claim 3 wherein the cyclodextrin is beta-cyclodextrin.

6. A method as defined in claim 3 wherein the ratio by weight of cyclodextrin to aspartame is at least 1.1:1.

7. A method as defined in claim 3 wherein the ratio by weight of cyclodextrin to aspartame is from about 1.1:1 to 100:1.

8. A composition comprising a dry inclusion complex formed between aspartame and a member selected from the group consisting of:
   (a) alpha-cyclodextrin;
   (b) beta-cyclodextrin; and
   (c) gamma-cyclodextrin,
   wherein said dry inclusion complex is prepared from the process comprising:
   (1) combining aspartame and a larger amount of the cyclodextrin in a medium suitable for the formation of an inclusion complex before a substantial degree of hydrolysis of the aspartame occurs, to form a mixture containing an inclusion complex of said aspartame and said cyclodextrin, and then
   (2) drying said mixture whereby said dry inclusion complex is formed.

9. A composition as described in claim 8 wherein: the medium is selected from the group consisting of water; aqueous methanol; and ethanol.

10. A composition as described in claim 8 wherein the cyclodextrin is beta-cyclodextrin.

11. A composition as defined in claim 8 wherein the ratio by weight of cyclodextrin to aspartame is at least 1.1:1.

12. A composition as defined in claim 8 wherein the ratio by weight of cyclodextrin to aspartame is from about 1.1:1 to about 100:1.

* * * * *